United States Patent
Webb (10) Patent No.: US 10,695,673 B2
(45) Date of Patent: Jun. 30, 2020

(54) INTERACTIVE EVENTS PLATFORM

(71) Applicant: Sony Interactive Entertainment America LLC, San Mateo, CA (US)

(72) Inventor: Jon Webb, Sausalito, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 14 days.

(21) Appl. No.: 15/900,631

(22) Filed: Feb. 20, 2018

(65) Prior Publication Data

US 2018/0185756 A1 Jul. 5, 2018

Related U.S. Application Data

(63) Continuation of application No. 15/140,406, filed on Apr. 27, 2016, now Pat. No. 9,895,611.

(Continued)

(51) Int. Cl.
| | |
|---|---|
| A63F 13/48 | (2014.01) |
| A63F 13/497 | (2014.01) |
| A63F 13/86 | (2014.01) |
| A63F 13/795 | (2014.01) |
| A63F 13/67 | (2014.01) |
| A63F 13/71 | (2014.01) |
| A63F 13/493 | (2014.01) |

(52) U.S. Cl.
CPC .......... *A63F 13/497* (2014.09); *A63F 13/48* (2014.09); *A63F 13/795* (2014.09); *A63F 13/86* (2014.09); *A63F 13/493* (2014.09); *A63F 13/67* (2014.09); *A63F 13/71* (2014.09)

(58) Field of Classification Search
CPC ........ A63F 13/30; A63F 13/35; A63F 13/352; A63F 13/48; A63F 13/60; A63F 13/61
See application file for complete search history.

(56) References Cited

U.S. PATENT DOCUMENTS

| | | |
|---|---|---|
| 6,080,063 A | 6/2000 | Khosla |
| 9,895,611 B2 | 2/2018 | Webb |

(Continued)

FOREIGN PATENT DOCUMENTS

| | | |
|---|---|---|
| JP | 2018-187400 | 11/2018 |
| WO | WO 2009/073801 | 6/2009 |

OTHER PUBLICATIONS

European Patent Application No. 16787094.8 Extended Search Report dated Jan. 15, 2019.

(Continued)

*Primary Examiner* — James S. McClellan
(74) *Attorney, Agent, or Firm* — Polsinelli LLP (57) ABSTRACT

The system is directed towards an interactive events platform. The interactive events platform may discover current in-game events associated with different video games currently available (or active). The platform may further notify a user of the discovered in-game events associated with different video games and facilitate the user joining a particular in-game event. The interactive events platform may also discover and notify the user of future in-game events associated with different video games. In some embodiments, the discovery and notification of any in-game events are based on games currently being played (or registered) with the user.

18 Claims, 8 Drawing Sheets

Related U.S. Application Data (60) Provisional application No. 62/153,444, filed on Apr. 27, 2015.

(56) References Cited

U.S. PATENT DOCUMENTS

| | | |
|---|---|---|
| 2004/0199370 A1 | 10/2004 | Arama et al. |
| 2005/0278041 A1* | 12/2005 | Bortnik .................. A63F 13/12 700/91 |
| 2006/0194633 A1 | 8/2006 | Paulsen |
| 2007/0006277 A1* | 1/2007 | Mills ...................... H04N 7/173 725/153 |
| 2007/0043616 A1 | 2/2007 | Kutaragi et al. |
| 2007/0191101 A1 | 8/2007 | Coliz et al. |
| 2007/0191102 A1 | 8/2007 | Coliz et al. |
| 2007/0265043 A1 | 11/2007 | Wang et al. |
| 2008/0146342 A1 | 6/2008 | Harvey et al. |
| 2010/0099495 A1 | 4/2010 | Brady |
| 2011/0045909 A1* | 2/2011 | Cole ...................... G06Q 10/06 463/42 |
| 2011/0250939 A1 | 10/2011 | Hobler |
| 2012/0060101 A1 | 3/2012 | Vonog et al. |
| 2012/0094757 A1 | 4/2012 | Vago et al. |
| 2012/0289339 A1 | 11/2012 | Wang et al. |
| 2013/0268393 A1 | 10/2013 | Haze et al. |
| 2014/0179440 A1* | 6/2014 | Perry .................... A63F 13/803 463/42 |
| 2014/0228112 A1 | 8/2014 | Laakonen et al. |
| 2014/0357375 A1 | 12/2014 | Rama Rao et al. |
| 2014/0364204 A1 | 12/2014 | Tornqvist |
| 2016/0310843 A1 | 10/2016 | Webb |

OTHER PUBLICATIONS

PCT Application No. PCT/US2016/029617 International Search Report and Written Opinion dated Jul. 27, 2016.

* cited by examiner

INTERACTIVE EVENTS PLATFORM

CROSS-REFERENCE TO RELATED APPLICATIONS

The present application is a continuation and claims the priority benefit of U.S. patent application Ser. No. 15/140,406 filed Apr. 27, 2016, issuing as U.S. Pat. No. 9,895,611, which claims the priority benefit of U.S. provisional application No. 62/153,444 filed Apr. 27, 2015, the disclosure of which is incorporated herein by reference.

BACKGROUND

Field of Invention

The present invention generally relates to in-game events. More specifically, the present invention relates to an interactive events platform and system for hosting in-game events and notifying users of the availability and means to engage with the same.

Description of the Related Art

The amount of time a user may spend playing a video game generally follows an expected pattern. The amount of time the user initially devotes to playing the game is typically greater than the time the user devotes to game play several weeks or months later. There may be many reasons that contribute to this decline in the amount of time dedicate to game play. For example, a user may complete the tasks or challenged offered by the game and the user sees no additional reason to engage in game play. The user may also become less interested or bored with the game because game play has become repetitive or due to inability to overcome certain challenges. The story line of a particular game may also be unsatisfactory to the particular tastes of the user. Further, there exist a number of games already on the market and new games are constantly being introduced that may divert the interests of the user.

In view of the challenge to retain user interest with respect to a particular game as long as possible, some game publishers or game platform providers may implement in-game events. In-game events are time-limited activities that introduce special or different game play elements. There are a variety of different types of in-game events that can be implemented.

For example, some time-limited events may introduce a story-related event or game-related challenge that further expands on the existing game and in which the users can participate. Other events may introduce some sort of bonus or benefit for joining the time-limited such as being able to acquire additional experience, resources (e.g., in-game currency), or loot (e.g., items or equipment/gear). These in-game events aim to maintain the interest of users for a prolonged period of time. In some instances, such events may be helpful in drawing older users back to the game after these older users have stopped playing for a prolonged period of time.

In-game events are also a way for companies to keep users engaged with a particular game thereby building long-time loyalty for the game, franchise, published, or game platform. User loyalty can be converted into free advertisement by way of word-of-mouth or other viral activity and increased sales by way of new users being introduced to a game by way of a friend.

As users remain invested in the game, a publisher, service provider, or platform can take advantage of opportunities to increase retention with the game. As described above, newer users may be drawn to the game from existing users because of the in-game event, which can result in team-based or clan-based game play. This may also have the benefit of reducing the number of 'used' game sales that might deprive a publisher of controlling after-market sales or otherwise dilute of a brand. Such retention may also allow publishers to provide events that include opportunities for current users playing the game to buy add-on or additional content (i.e. expansions) or obtain access to subsequent titles at an early date.

From a user perspective, in-game events are enjoyable because they introduce new experiences and challenges. In-game events also motivate friends to join and experience the event as well. Events like these also make a user feel that their purchasing dollar has been well spent and helps create an affinity to a brand, publisher, or platform, which in turn allows for the generation of future content, experiences, and events that may further keep the user happy with the purchase thereby creating a self-perpetuating cycle of content and game play loyalty.

In-game events may be problematic, however, in that unless the user is actively engaged with the game, these in-game event opportunities may be missed with respect to when the in-game events actually occur. For example, users may opt to receive messages (e.g., e-mail or texts) regarding special in-game events associated with a game. Other games provide notification of in-game events to the users within the operation of the game (e.g., as a part of a title screen, waiting room, or main menu). The former option may generate notifications that can potentially be viewed as unwanted text or e-mail traffic from users that may subsequently be dismissed as spam or lost amongst a series of other communications. With the latter instance, if the user is not actively following a particular game, then the user may not encounter the title screen or menu screen providing information as to when in-game events may occur (e.g., currently or in the future).

Also problematic is the fact that even if the user remembers that an in-game event is occurring, there may be confusion as to how the user can participate. For example, the in-game event may require that the user perform a certain task, participate in a particular mode of gameplay, or be in a certain location within the game at a certain time, and so forth. Certain credentials or a special password may also be required. It should be noted that users may also be engaged in numerous in-game events over multiple games that are currently being played by the user.

There is a need in the art for a system that not only discovers and notifies the user of in-game events, but also provides an easy way for the user to engage with the same.

SUMMARY OF THE PRESENTLY CLAIMED INVENTION

A systems for an interactive events platform is presently claimed. The system includes a plurality of computing devices that are used to host their respective in-game events, one or more client computing devices, and a network computing device. The network computing device includes a variety of features that support the interactive events platform presently claimed. The network computing device communicates with the game computing device in order to receive information about in-game events. The received in-game event information may include information about the event that is displayed for the user to view but also include information that can facilitate streamlining user access to the in-game event. The received information is provided to the users, via their respective user computing devices. Users, via their respective user computing devices, can participate in one or more in-game events. Based on the user input associated with the displayed in-game event information, the network computing device generates corresponding instructions that is used to streamline the user's gameplay experience with the in-game event. User information is provided, from the user computing device to the game computing device via the network computing device. Furthermore, the network computing device initiates the user client device for the in-game event automatically.

DETAILED DESCRIPTION

Embodiments of the present invention concern implementing an interactive events platform. The interactive events platform may discover current in-game events associated with different video games currently available (or active). The platform may further notify a user of the discovered in-game events associated with different video games and facilitate the user joining a particular in-game event. The interactive events platform may also discover and notify the user of future in-game events associated with different video games. In some embodiments, the discovery and notification of any in-game events are based on games currently being played (or registered) with the user. The environment facilitates user awareness and participation with respect to in-game events. Through better implementation of in-game event awareness, increased user participation may be recognized and companies or platforms can more easily maintain a prolonged interest in the game for many users over a longer period of time.

Figure 1A:
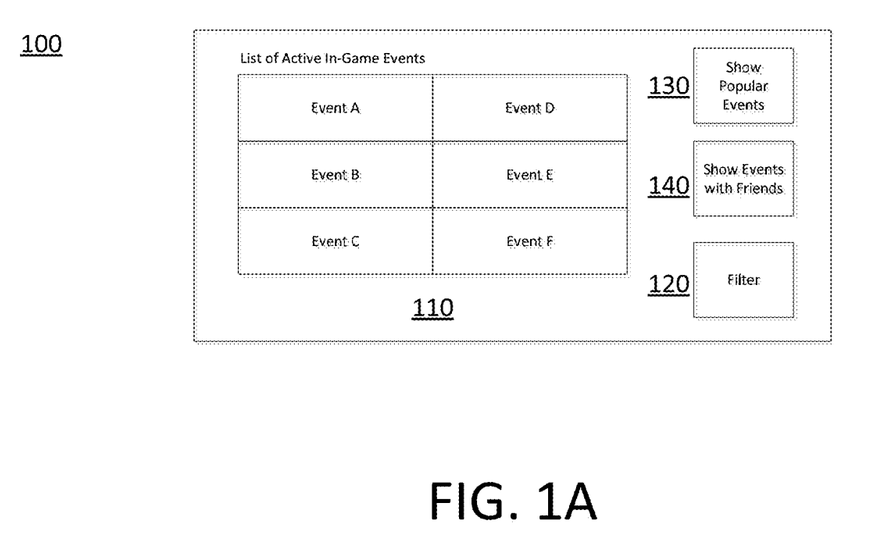
FIG. 1A and FIG. 1B illustrate an events destination interfaces.
Figure 1B:
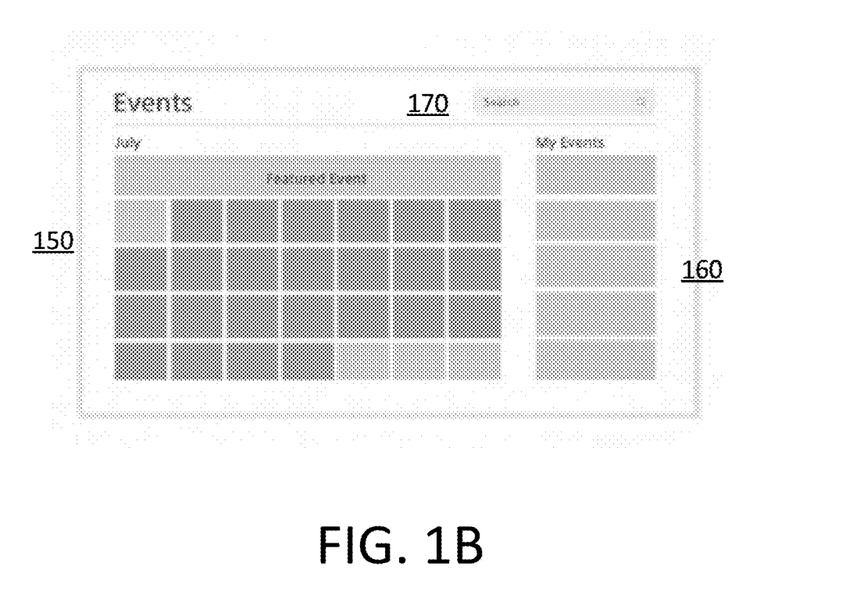

FIG. 1A and FIG. 1B illustrate event destination interfaces 100. With reference to FIG. 1A, the events destination interface 100 may be initially displayed with the interactive events platform or be viewable via menu elements (e.g., 'events'). The events destination interface 100 of FIG. 1 includes a list of all in-game events currently active 110. In some embodiments, this list may correlate instead to the respective game titles currently owned, rented, or otherwise in active play by the user. The user can customize or filter the list 110 to identify those games currently owned, rented, or otherwise in active play via a filter option 120. The user can also include games on the list 110 in which the user is interested in following but does not currently own, rent, or otherwise actively play. This list 110 may also include future in-game events associated with the aforementioned game titles associated with the user.

The features of the events destination interface can be implemented over different devices (e.g., other gaming consoles, mobile devices, desktops) that are also capable of running games. In other embodiments, the events destination interface is also implementable via computing devices that are not associated with gaming or have gaming capabilities (e.g., a smart watch).

With the events destination interface 100, general information about the events may also be included that further facilitates advertising for a particular game. For example, with the list of all in-game events that are currently active, the events destination interface 100 may include a ranking of popular events based on how many different users are currently participating in the particular event 130. Acquaintances within the game (e.g., teammates, guild mates, rivals) or real-life friends of the user who are currently participating in an in-game event may also be listed 140. In other embodiments, the list of other users may also include a more popularly received in-game event may be a catalyst that encourages newer users to buy the game in order to experience the popular in-game event.

In an alternate embodiment, the events destination interface 100 may appear as illustrated in FIG. 1B. In this alternate embodiment, the events destination interface 100 includes a calendar 150 that includes information about the various in-game events. For example, a calendar for the current month may include indication of what in-game events are currently active or will be active within that month. Users may be allowed to view future months to see any in-game events planned later in the year as well. A list of user in-game events may be provided 160 on the events destination interface 100. This list of user-in game events 160 may include a list of in-game events that the user is participating in, registered for or at least interested in participating.

The user may also be allowed to search for or filter the variety of in-game events illustrated on the calendar 150. The user can filter, via search options 170 associated with the events destination interface 100. By entering in, for example, the name of the game or the title of the event, the events destination interface 100 may provide a list of related in-game events for the user to view (not shown).

Figure 2:
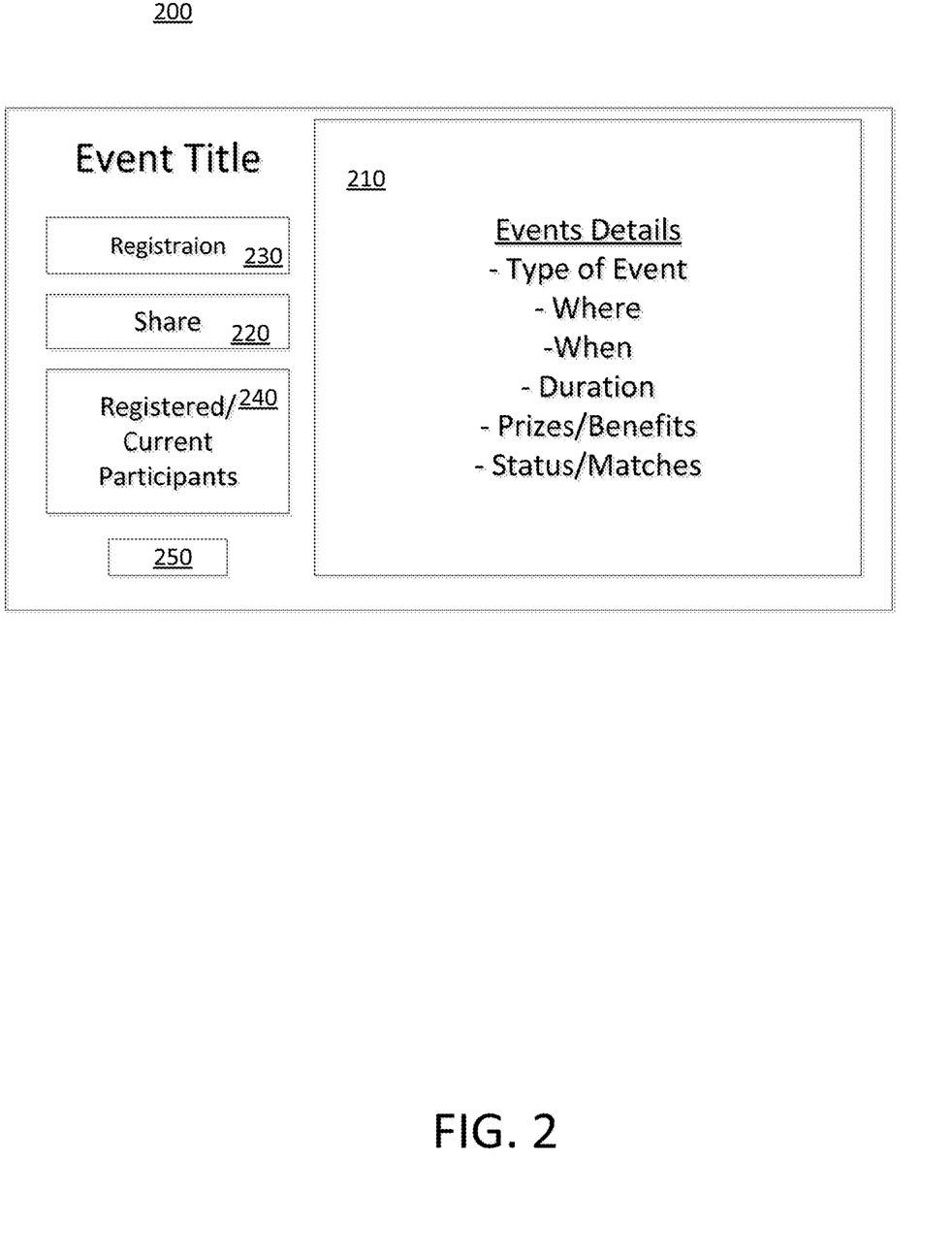
FIG. 2 illustrates a detailed events interface.

FIG. 2 illustrates a detailed events interface 200. This interface 200 can be obtained through user selection of one of the listed in-game events displayed on the events destination interface 100 of FIG. 1. The detailed events interface 200 may provide a variety of different information associated with the selected in-game event. For example, the detailed events interface 200 will include specific details 210 regarding the in-game event; specific details that include the title of the event, pre-requisites (if any) for joining the in-game event, prizes/loot that can be acquired, description of the type of in-game event that will be hosted, where the in-game event will be hosted (e.g., in-game location, particular gameplay mode) as well as when (e.g., date and time) and how long (e.g., duration) the in-game event will occur for.

The displayed detailed information about an event may not be static. In some embodiments, this detailed information can be modified and updated as required. For example (and as described in further detail below), some events may include tournaments that includes competition between users or teams of users. Tournaments may typically have set matches that need to be completed. The detailed information can include information about upcoming matches and would be updated based on results from completed matches.

The detailed events interface 200 may also include other features aside from details regarding the in-game event. For example, features may allow a user to 'share' 220 the information about the in-game event with other users (e.g., friends). Features may also allow a user to register 230 for the event. Registration may include indicating an intention to participate with respect to the in-game event but may also include a willingness to receive notifications and reminders about the event via, for example, text or email). When registration for an event is allowed, a list of users who have registered for the event 240 may be displayed for the user to view. This list may highlight, for example, any users that are on the user's friends list.

The act of registering for the in-game event may be requested or required for some in-game events if the in-game event has a maximum number of allowed participants (e.g., user player cap). For example, a player cap may be implemented for an in-game event that is being hosted as a competition or tournament where various users can compete against each other individually or in teams to achieve prizing (e.g., in-game resources, loot) and/or a ranking. The user player cap may be implemented for a variety of reasons such as ensuring that the tournament can be completed within a reasonable time or to ensure that servers associated with the game can efficiently carry out the in-game event without causing significant problems (e.g., network processing).

As noted above, the detailed events interface 200 may include information regarding how many different users have registered for the in-game event 240. The detailed events interface 200 may also include information regarding how many users (and the identity of the same) are currently participating in the in-game event. The list of different users currently participating in the in-game event may also include a list of users (e.g., friends, guild/clan members) that the user can view. The list of users that have registered 240 or are currently participating in the in-game event can provide the user an understanding as to how popular a certain in-game event may be.

The detailed events interface 200 may also provide a start/launch option 250. Said option may facilitate entry into the in-game event. For example the option 250 may include a user selectable button labeled 'Launch' or 'Start.'

Although the detailed event interface 200 provides information about where the in-game event may be hosted, users may not be immediately clear on where to go in order to participate in the in-game event. Therefore, the start/launch option 250 may assist in streamlining user entry into the in-game event. In particular, the start/launch option 250 is customized for each in-game event and may also include custom features associated with the specific user participation in the in-game event.

For example, selection of the start/launch option 250 when the user is playing alone may only automatically initiate the game and set up the game play environment (e.g., select the appropriate game mode or transport the user's character to the appropriate location) so that the user can begin participating in the in-game event. In contrast, a plurality of users utilizing the start/launch option 250 in an in-game event that is a tournament would facilitate match making and setting up corresponding features (e.g., parties, team-chat, peripherals such as microphones) with the other users.

As noted above, the start/launch option 250 facilitates setting up the game environment for the user. In an embodiment where the user may decide to participate in an in-game event with one or more friends, selection of the start/launch option 250 may place the user within the game and establish a new party with the user's one or more friends who may already be within the game participating with the in-game event. Alternatively, if a party is already formed within the game, the user may be added automatically (or a request be automatically sent to a party leader to request the addition of the user to the existing party). It should be noted that the start/launch option 250 may require additional input from the user, for example, indicating the friend(s) the user wishes to participate in the in-game event with.

The start/launch option 250 may be implemented by the developer and carried out by the interactive events platform. In particular, the developer may implement corresponding instructions that would instruct a game being initiated by the user to generate a corresponding game environment associated with the in-game event. When the user selects the start/launch option 250, the interactive events platform may use the instructions provided by the developer to have the user's game streamline the user's entry into the in-game event.

It should be noted, however, that the start/launch option 250 may not always be implemented by the developer for their in-game events. In situations where such an option is not used, user selection of the option 250 may merely initiate the game. Once the game is initiated, the user may be required to navigate to the appropriate environment (e.g., game location, mode) where the in-game event is occurring. The existence of the start/launch option 250 is provided so that developers can assist the user in participating with the in-game event.

The information regarding various in-game events may be removed or deleted from the events destination interface and/or the interactive events platform once the particular in-game event has expired. By removing or deleting expired events, the list of in-game events can be kept up-to-date with current events and not include the clutter that arises if expired events still occupy the same list. Information about past events, however, does not need to be completely deleted or removed from the events destination interface. Past in-game event information may be kept in a separate list that users can reference again at a later date.

For example, an in-game event may include a tournament involving a pre-determined number of players. Information about the tournament (e.g., audio/video recordings, results, statistics) may be stored in memory so that users who missed the in-game event can still search and obtain the information (e.g., view match recordings) about that expired event. The in-game event information may be stored in a separate location (e.g., servers) distinct from where the game is run (e.g., game computing devices), the network facilitating the interactive event platform and/or the client device. Furthermore, the list of expired events may be kept separate from the list of current in-game events. In this way, the interactive events platform can still maintain the current available in-game events without cluttering the list with expired events.

Figure 3:
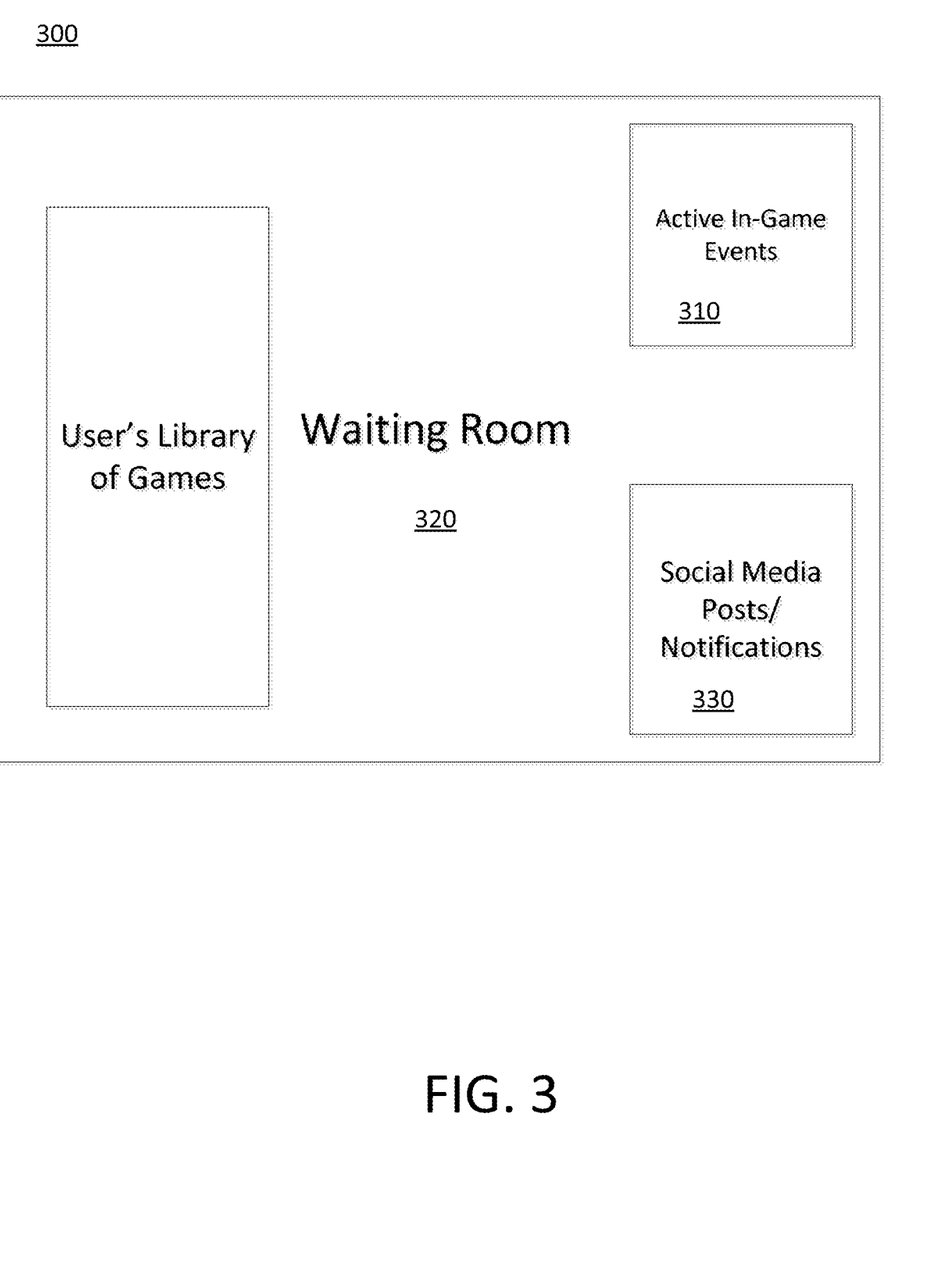
FIG. 3 illustrates an interface for event discovery.

FIG. 3 illustrates an interface for event discovery 300. As noted above, users may easily miss or overlook the existence of current in-game events associated with various games. Some in-game events may provide notifications during interactions with the particular game (e.g., main menu, waiting room, title screen). Embodiments of the present invention facilitate user discovery of in-game events more so than what currently exists in the art.

For example, notifications regarding when an in-game event is available can be published in a number of locations that provides more visibility to various users. Aside from interactions with the game, the notifications 310 can be associated with a main menu or lobby 320 for the events destination interface 300. The main menu or lobby 320 can correspond to an area associated with the computing device (e.g., game console) that includes features that connects the user to various games (e.g., games the user currently owns). Through this embodiment, the user would not need to enter a particular game to discover what in-game events exist.

In other embodiments of the present invention, notifications can also be provided to the user via social media 330. By voluntarily choosing to 'follow' a particular game via social media (e.g., Facebook, Twitter), the developer for the game may provide notifications via social media 330 about current and upcoming in-game events that users can receive and view. These social media posts/notifications can be viewable, for example, in the main menu or lobby 320.

Discovery for current in-game events can also be provided to the user via notification of other user participation and/or registration with an in-game event. Other users (e.g., friends) associated with the user can provide status updates for the user to view. These updates for the user may be triggered based on, for example, a friend registering or playing in an in-game event for a game that the user currently is playing.

Figure 4:
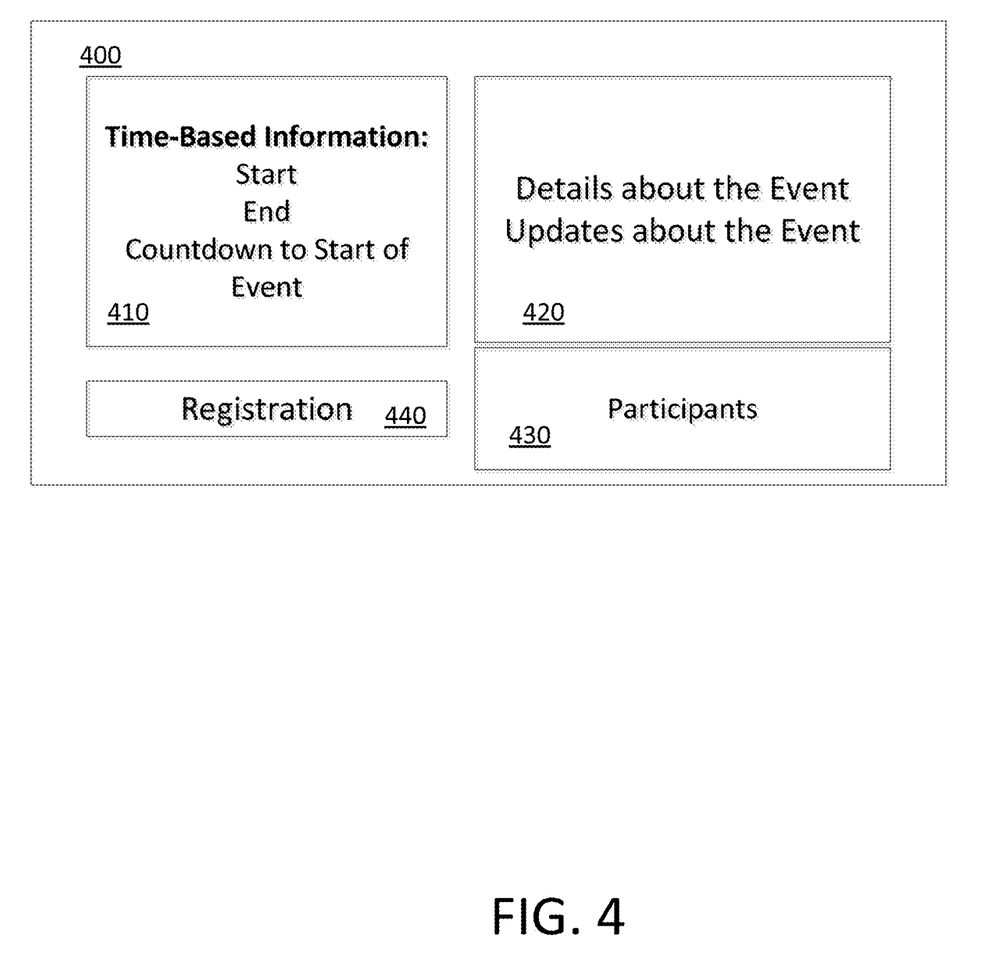
FIG. 4 illustrates a registration screen for an in-game event.

Some in-game events may request or require that the user register for the in-game event in order to participate. In some cases, users may be requested to pre-register for the event in advance of the start of the in-game event. FIG. 4 illustrates a registration screen for an in-game event 400.

The registration screen for an in-game event 400 may be obtained, for example, via the registration button 230 of the detailed events interface 200 of FIG. 2. The registration screen 400 may include similar information provided on the detailed events interface 200. Such information includes any time-based information 410 that could include one or more of the following: a start date/time, an end date/time, a remaining time left for the event and a countdown to the start of the event.

The registration screen 400 may include similar if not the same detailed information about the in-game event 420. This detailed information may similarly include details about the events and the rewards/benefits for joining the event. A list of registered users 430 for the event may also be shown. An emphasis on the user's friends may be provided such that they are shown first or are highlighted in the list of registered users 430. In some embodiments, the user's friends can be located in a separate list.

The registration screen 400 would also include a user-selectable feature 440 that would carry out the user registration for the in-game event. For example, upon selection of the feature 440, the user's account could be listed as being registered for the event, be eligible to participate in the event (if registration is required) once the in-game event begins and receive notifications, reminders and updates regarding the in-game event. This type of registration may be a "default" way of registering for an event.

As noted above, it may be possible to provide notifications and reminders to the user for those events where the user has registered. These notifications may include a countdown until the in-game event starts, the time and place corresponding to the start of the in-game event and countdown to when the in-game event ends.

Notifications can be provided from the interactive events platform to the user via their computing device/game console. These notifications may pop up when the user is using the corresponding game console/computing system. Notifications can also be provided as text messages or emails. The user would be allowed to specify how the reminders can be received (e.g., text, emails, popups) as well as where the reminders should be provided to (e.g., game console, smartphone, desktop/laptop).

Once the user has registered for an event using the registration screen, the system may identify the user as being registered (e.g., via a special mark/symbol). This status of being registered for the in-game event can be subsequently provided by the system to the game computing device (e.g., game client, game server).

The developer may be allowed to provide customized registration to be completed by users in order to register for an event. In this way, games may have different ways to register for an event. For example, a developer or a tournament organizer may request additional information about the user. This information can be used to determine eligibility to join the in-game event. This determination of eligibility can be performed on the developer side, by the system or by both. The developer or tournament organizer may provide, for example, guidelines for the system to use to help evaluate whether a user is eligible for the in-game event (e.g., tournament). In this way, the registration for in-game events can be streamlined by both the game computing device and the network computing device.

With reference to the interface for event discovery discussed above with FIG. 3, user registration for an in-game event using the registration screen of FIG. 4 may also trigger notification of the registration to other users. For example, the user may provide notifications to all their friends that they had just registered for an event. This type of notification, in response to registration, can be used to spread awareness of a particular in-game event.

The notifications that are received by the user via e-mail or as text are capable of including the same sort of information as provided in the above detailed events interface. The notifications may include details regarding the name of the event, description of the in-game event, the start time, the end time and the location of the in-game event. This notification would be useful as a reminder so that the user does not forget to participate in the in-game event, especially in situations where the user pre-registered for the event in advance.

Notifications received while on the gaming console may pop up and indicate to the user that the in-game event is about to begin or has begun. The pop-up notification may include a user selectable option that allows the user to automatically participate in the in-game event if selected. This option would allow the user to leave whatever the user is currently doing (i.e. playing one game) and enter into a different game corresponding with the in-game event. Alternatively, the pop up notification may forward the user to the detailed event interface for the specific in-game event referenced in the notification. From there, as discussed above, the start/launch option could be selected to streamline the user's participation in the in-game event.

Figure 5:
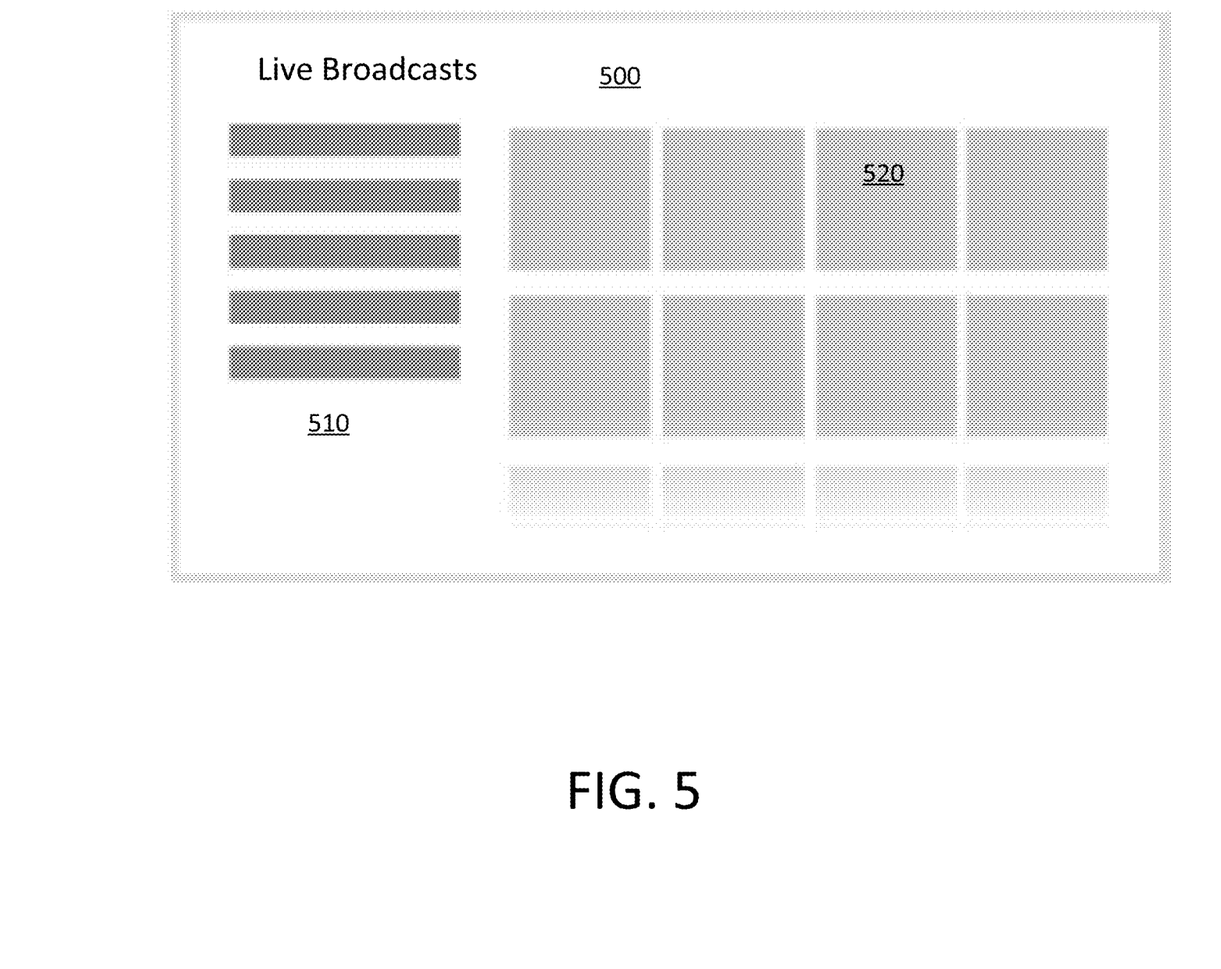
FIG. 5 illustrates a live broadcast interface.

FIG. 5 illustrates a live broadcast interface 500. In an embodiment of the present invention, where an in-game event includes live broadcast (e.g., discussion with developers, on-going tournament), the start/launch option may bring up a live broadcast interface 500. The live broadcast interface 500 may include a list of games 510 that currently have live broadcasts 520 available for the user to view. These broadcasts may include developers talking about the particular game or players currently playing the game (i.e. streamers) who elect to share their in-game gameplay experience for other users to view.

In other embodiments, this live broadcast interface 500 may also include past recordings of broadcasts 520 available for the user to view. The past recordings of broadcasts 520 may be stored, for example, in memory (e.g., archives) associated with the live broadcast interface 500. These past recordings can be retrieved by users and viewed on demand. In still further embodiments, these past recordings may also be provided to other destination (e.g., Youtube, Twitch) where users can also view the past recordings using different platforms and devices.

The broadcasts that are viewable by users through the live broadcast interface 500 may be organized any number of ways. For example, the broadcasts 520 may be organized, as described above, by games 510. The broadcasts 520 may also be arranged by users or by popularity. Once a particular game is selected from the list of games 510, the live broadcast interface 500 will display the various live broadcasts (or streams) associated with the selected game. The user can select a particular stream and begin viewing the live broadcast.

When the user is navigated to the live broadcast interface 500, the user automatically leaves or, alternatively, pauses whatever activity in which the user was previously engaged (e.g., playing a different game). Upon selection of a live broadcast 520, the live broadcast can be displayed for the user to view, for example, via a pop-up. Once the user is finished with viewing the live broadcast 520, some embodiments of the present invention may allow the user to resume where the user left off before.

Figure 6:
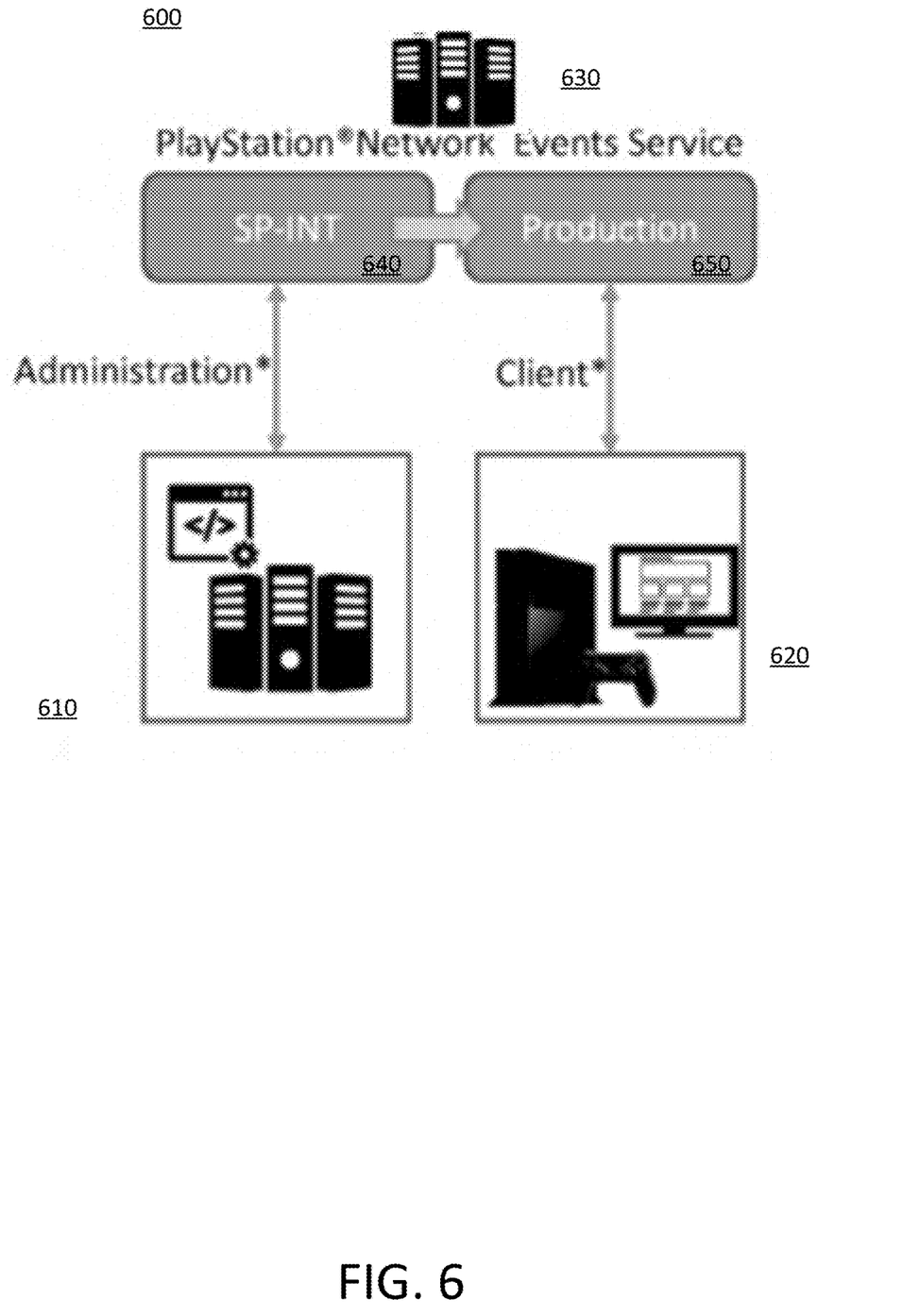
FIG. 6 illustrates an exemplary system for implementing an interactive events platform.

FIG. 6 illustrates an exemplary system 600 for implementing an interactive events platform. The system 600 includes one or more game computing devices (i.e. servers) 610 associated with carrying out the particular game, one or more client computing devices 620 from where users will be participating in the in-games events from, and one or more network computing devices 630 for facilitating the game experience for the user between the gaming computing devices 610 and client computing devices 620. As described herein, the computing devices (e.g., game, client, and network) may include any known computing devices. These computing devices may include any number of processors and memory to carry out their respective instructions. Exemplary computing devices may include, for example, desktops, laptops, mobile devices (e.g., smartphones), tablets and game consoles (e.g., PlayStation 4).

With the system 600, as illustrated in FIG. 6, developers associated with the game may have various game computing devices 610 for their respective games. Generally processes for the game involving only one player (e.g., single player campaigns) can be performed on the respective client computing device 620. When the game involves multiple users over an online feature, however, the game computing devices 610 may be used to facilitate the various connections between the multiple players via a common online game environment. The game computing devices 610 may also host the online environment(s) where the multiple players would participate in the in-game event.

The network computing devices 630 facilitate the discovery, notification and streamlining of the in-game events between the users (via the client computing devices 620) with the game (via the game computing devices 610). Whenever a developer, via the game computing devices 610, provides information about an in-game event to the network computing devices 630, the information can be forwarded to the user at the client computing devices 620. When a user indicates that he/she would like to participate in an in-game event via their client computing device 620, the network computing device 630 forwards the information to the game computing device 610. Furthermore, the network computing device 630 may perform various additional processes to facilitate streamlining the user experience when beginning the in-game event.

Although further details regarding how in-game event information is provided to the network computing device 630 from, for example, the developer is provided below, it should be noted that the network computing device 630 includes a development (or service provider integration 640) feature and a production 650 feature associated with the in-game events.

The service provider integration feature 640 allows users (e.g., developers) to test whether aspects of the in-game event are compatible with the interactive events platform. For example, the service provider integration feature 640 can be used to ensure that information about the in-game event appears properly on the detailed events interface. Developers can customize how such information appears and what information is displayed. Furthermore, developers can test interactions with the computing devices of the system 600 (carried out, for example, through corresponding code) to ensure that a user is capable of entering an in-game event smoothly (e.g., initiating the game properly). Once the tests have been carried out and the in-game event is ready, developers can use the production feature 650 to release the in-game event to the public. Release of the in-game event to the public may refer to providing the in-game event information to the interactive events platform (via the network computing device 630) even though the event itself may not begin until later.

To facilitate the development of in-game events and how they interact with the interactive events platform, the present invention provides a plurality of application programming interfaces (APIs) associated with the network computing device 630 that developers can use to develop how the in-game event operates with the interactive events platform and provide the information to be used by the interactive events platform.

In-game event data may include event metadata that provides the details for the in-game event that will be displayed, for example, on the detailed event interface. Developers provide the in-game event data, via their game computing devices 610 using the APIs associated with the network computing devices 630. The APIs facilitate developers in populating the different types of information for the in-game event to the interactive events platform. Such information include how the information is displayed, the start/end dates, duration, what details are provided about the event and rewards, registration processes and streamlining (e.g., autoboot) of the in-game event using the start/launch option described above.

This information associated with the in-game events can be updated and modified as needed. In some embodiments, users may need authorization to populate and/or modify aspects of in-game events. For example, if a developer would like to populate information and/or modify information for in-game event, an authorized user account would need to be used. This may be incorporate to ensure that events are properly hosted by recognized game developers. In contrast, if a single user would like to create and/or modify an in-game event for a few friends or acquaintances, an authorized user account may not be needed. Alternatively, there may be different types of user accounts that dictate what type of events can be created.

As noted above, in-game events may be generated by a single user. These in-game events may be associated for a smaller group of users (e.g., acquaintances, friends) associated with a particular task or challenge to complete within the game. The group of users may be public (i.e. open invitation) or private (i.e. limited to the identified users in the in-game event). A user can schedule a time where various other users would all play the game at the same time with the user.

In order to carry out the creation of this in-game event for the user and the user's friends, the user would create the in-game event and provide information regarding the in-game event to the network computing device. This user-created in-game event can then be developed and published to the user's friends in a similar manner as the developer created in-game events. It should be noted that the user may or may not have access to the same APIs that developers can use to create and publish their in-game events. In some embodiments, users may have different APIs than the ones usable by developers. In some cases, from the view of the user's friends, the interactive events platform may provide distinguishing marks (e.g., symbol, text color) that can be used to distinguish between a user created in-game events from a developer created in-game events.

As noted above, the network computing device 630 can facilitate streamlining the user participation (via their respective client computing devices 620) with the in-game events (via the game computing devices 610). As noted above, the interactive events platform (e.g., detailed events interface) allows the user to initiate the in-game event via a start/launch option. The network computing device 630 provides this functionality to games through the use of APIs that allows the developer to provide instructions directed at automatically setting up the user's game experience. For example, the user's game, once initiated, can be instructed to establish a game environment related to the in-game event.

If the in-game event involves the user playing with other users (e.g., friends) whom the user would like to play with, the generated instructions may identify these other users and update the game computing device so that the user and these other users can join the same in-game event. In some embodiments, these generated instructions for the game to generate a gaming environment where these users are within the same party at the in-game event. In other embodiments, peripherals (e.g., microphones, cameras) or other in-game features (e.g., group chat) may also be initiated so that the user has access to these automatically once the user is able to participate in the in-game event.

As an embodiment of the present invention, the interactive events platform is usable with respect to E-sports and tournaments. Generally, e-sports are organized multiplayer video game competitions between players involving one or more games of various genres such as FPS (first person shooters), MOBAs (multiplayer online battle arena), strategy and fighting games. These competitions may incorporate live broadcasts as well as include prizes. Example games active in the E-sports scene include games from the Call of Duty and Street Fighter franchises. The present invention would be incorporated into the E-sports and tournament scene by streamlining organization and management of the event.

As an example, the interactive events platform may be used to generate an in-game event specific to the tournament. Although some tournaments (e.g., smaller scale) may be generated by users or companies associated with a particular game, other tournaments (e.g., larger scale) may be restricted to specific companies/partners (e.g., Intel Extreme Masters, Evolution Championship Series) that focus on hosting tournaments.

The network computing system 630 may also include other elements other than what is illustrated in FIG. 6. For example, the network computing system 630 may include features for managing administrative user-related information on behalf of the game computing device 610. For example, this user management feature can be directed towards processing and storing in-game event information that is displayed for the user to view, sending notifications for each user, and managing user information and social connections.

The network computing system 630 may also include features that helps manage the in-game events alongside the game computing device 610. For example, these game management features may contain game server systems used to coordinate the in-game events alongside the game computing device 610. In this way, the network computing system 630 can facilitate some game processes that would have been performed by the game computing device 610 such as score keeping and rewards. The game management features of the network computing system 630 can also include 'back-office' systems thereby facilitating a developer to administrate an in-game event using the network computing system 630.

Figure 7:
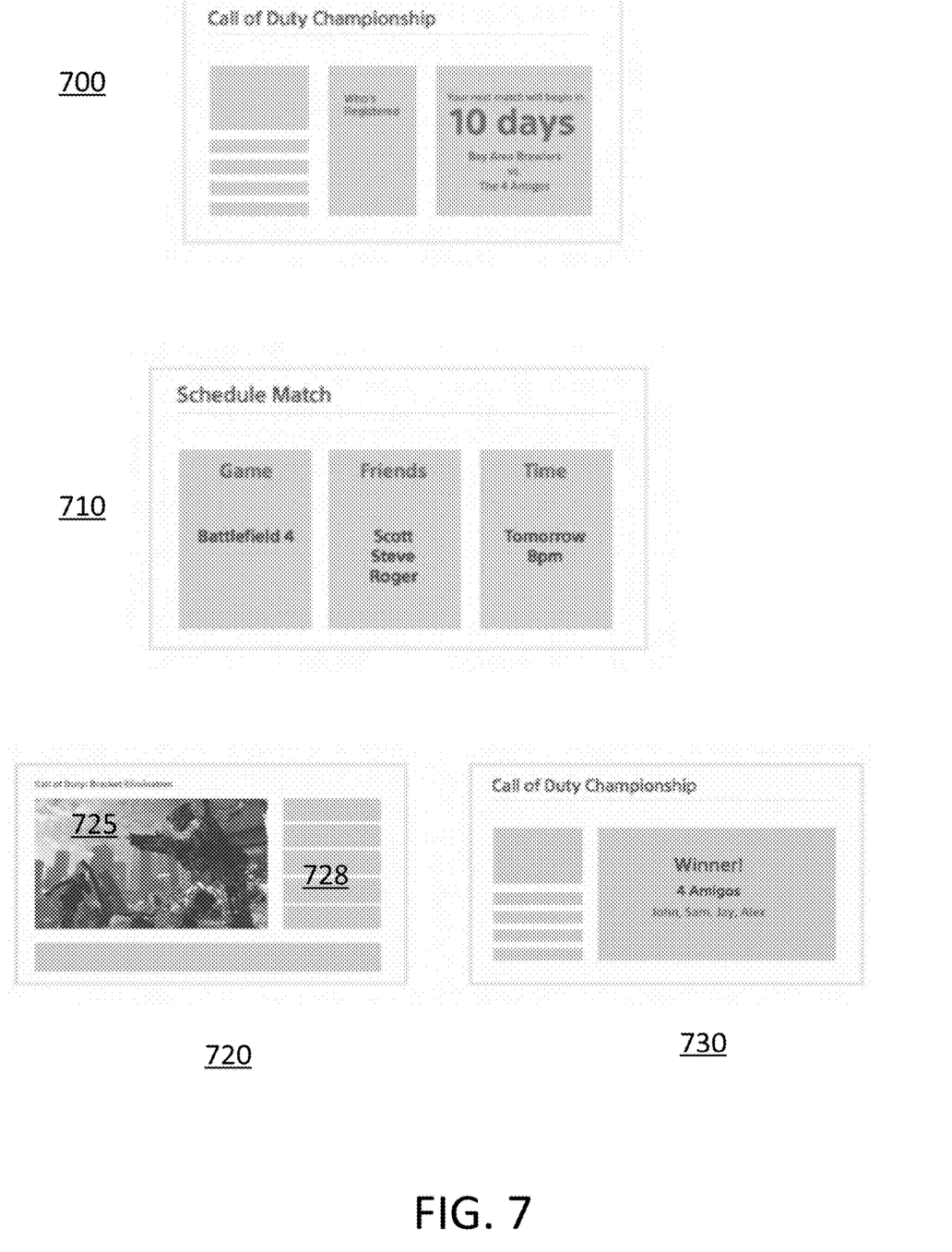
FIG. 7 illustrates various tournament interfaces.

FIG. 7 illustrate various tournament interfaces. In a first tournament interface 700, information about the tournament may be displayed. Tournaments may specify particular players and/or teams that would be eligible to join. Furthermore, details regarding the matches (e.g., brackets) as well as a time frame in which the match should be completed would be included as well. Specific players and/or teams may register for the in-game event through the tournament interface.

In a second interface 710, information regarding a match within the tournament can be provided. For example, information may include the game the tournament is for, who is participating in the tournament (e.g., team) as well as what time the match will occur. It should be noted that start/launch options can be included with the tournament interface 710 that would streamline the match making/pairing of the players or teams within the tournament if a bracket is involved. When the start/launch option is selected, the user and the user's teammates may automatically be initiated into the game and placed within the same game instance as the opponents based on the bracket. Otherwise, the pairing may be done based on other criteria (e.g., ranking) or randomly. In any case, the start/launch option could be used to ensure that the correct users are initiated into the correct instance of the game that includes the user's teammates and corresponding opponents. Corresponding features, such as team chat, could also be automatically enabled so that individual user setup is not needed prior to the start of the match.

A third tournament interface 720, can be provided to allow users to view past or ongoing matches. This tournament interface 720 may include a past recording or live stream of the match 725. Additional information 728 may also include the participants within the match as well as any game-related information of interest (e.g., statistics, status of each player). In some embodiments, comments from other users can be provided about the match. These comments can be displayed on this tournament interface 720 for viewing by other users.

Once a match is complete, processes may be included with the interactive events platform whereby results are obtained. Results are then used to update the in-game event information shown on the interactive event platform viewable by any number of users. In order to provide results for the interactive events platform, users may be required to submit a screen shot that illustrates who is the winner/loser of the match. In some embodiments, this result may be acquired automatically by the interactive events platform by evaluating game-based data (e.g., score, life left, status).

The interactive events platform, as described above, when used with E-Sports/tournaments would better automate the organization and management of the tournament. This reduces the need for administrators to manually pair players and/or teams within the game. Rather, the pairing and game set up is provided automatically via the interface using, for example, the tournament bracket that was initially provided with the in-game event set up.

Once updated, the tournament results can be viewed, for example, through the use of a fourth tournament interface 730. The information about the results may include various statistics or details about the match, who was involved in the match as well as a past recording of the match. In some embodiments, this information may also be included in the detailed events interface for users to view as well.

Although the above description and figures describe embodiments of the interactive events platform usable in the realm of games, it should be noted that this platform is also usable outside games as well. For example, a similar embodiment could be used with business that would facilitate conference calls or meetings held via teleconference or video. Events (e.g., meetings) could be scheduled with an identified number of participants. These events could be provided notification of the event via a variety of different ways (e.g., email, text, pop-up on a computing device). The notification may include information regarding the event and provide a start/launch option that streamlines the user's access to the event (e.g., automatic setting up of the conference call/video conference) on the user's computing device.

It should be noted that the interactive events platform may be implemented in an application that may be operable using a variety of end user devices (i.e. computing devices). For example, an end user device may be a personal computer, a home entertainment system (e.g., Sony PlayStation4), a portable gaming device (e.g., Sony PSP), or a home entertainment system of a different manufacturer. The present methodologies described herein are fully intended to be operable on a variety of devices. The present invention may also be implemented with cross-title neutrality wherein an embodiment of the present system may be utilized across a variety of titles from various publishers.

These end user devices may include non-transitory computer-readable storage media. Such media refers to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

Figure 8:
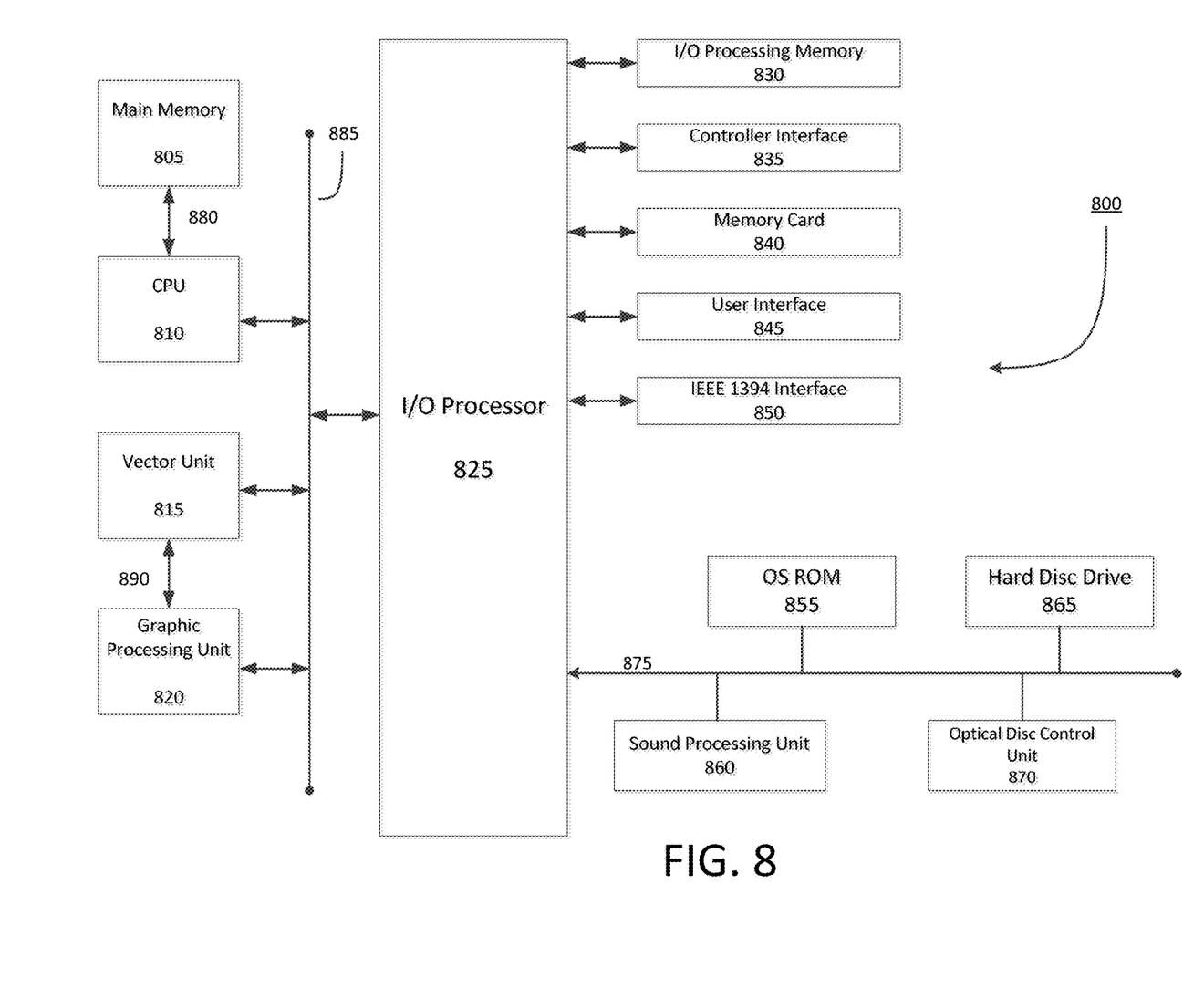
FIG. 8 is a block diagram of an exemplary electronic entertainment system.

FIG. 8 is a block diagram of an exemplary electronic entertainment system 800. The entertainment system 800 of FIG. 8 includes a main memory 805, a central processing unit (CPU) 810, vector unit 815, a graphics processing unit 820, an input/output (I/O) processor 825, an I/O processor memory 830, a controller interface 835, a memory card 840, a Universal Serial Bus (USB) interface 845, and an IEEE 1394 interface 850. The entertainment system 800 further includes an operating system read-only memory (OS ROM) 855, a sound processing unit 860, an optical disc control unit 870, and a hard disc drive 865, which are connected via a bus 875 to the I/O processor 825.

Entertainment system 800 may be an electronic game console. Alternatively, the entertainment system 800 may be implemented as a general-purpose computer, a set-top box, a hand-held game device, a tablet computing device, or a mobile computing device or phone. Entertainment systems may contain more or less operating components depending on a particular form factor, purpose, or design.

The CPU 810, the vector unit 815, the graphics processing unit 820, and the I/O processor 825 of FIG. 8 communicate via a system bus 885. Further, the CPU 810 of FIG. 8 communicates with the main memory 805 via a dedicated bus 880, while the vector unit 815 and the graphics processing unit 820 may communicate through a dedicated bus 890. The CPU 810 of FIG. 8 executes programs stored in the OS ROM 855 and the main memory 805. The main memory 805 of FIG. 8 may contain pre-stored programs and programs transferred through the I/O Processor 825 from a CD-ROM, DVD-ROM, or other optical disc (not shown) using the optical disc control unit 870. I/O Processor 825 of FIG. 8 may also allow for the introduction of content transferred over a wireless or other communications network (e.g., 4$, LTE, 3G, and so forth). The I/O processor 825 of FIG. 8 primarily controls data exchanges between the various devices of the entertainment system 800 including the CPU 810, the vector unit 815, the graphics processing unit 820, and the controller interface 835.

The graphics processing unit 820 of FIG. 8 executes graphics instructions received from the CPU 810 and the vector unit 815 to produce images for display on a display device (not shown). For example, the vector unit 815 of FIG. 8 may transform objects from three-dimensional coordinates to two-dimensional coordinates, and send the two-dimensional coordinates to the graphics processing unit 820. Furthermore, the sound processing unit 860 executes instructions to produce sound signals that are outputted to an audio device such as speakers (not shown). Other devices may be connected to the entertainment system 800 via the USB interface 845, and the IEEE 1394 interface 850 such as wireless transceivers, which may also be embedded in the system 800 or as a part of some other component such as a processor.

A user of the entertainment system 800 of FIG. 8 provides instructions via the controller interface 835 to the CPU 810. For example, the user may instruct the CPU 810 to store certain game information on the memory card 840 or other non-transitory computer-readable storage media or instruct a character in a game to perform some specified action.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed:

1. A system for an interactive events platform used for in-game events, the system comprising:
   a game server that hosts an in-game event;
   a plurality of client computing devices each storing information regarding an associated user, wherein each of the client computing devices has an events interface; and
   a network computing device that:
      receives in-game event information from the game server, wherein the in-game event information includes instructions for customizing in-game event access based on the user information,
      forwards the in-game event information to the plurality of client computing devices, wherein the in-game event information appears on the events interface of the plurality of client computing devices,
      receives a request made through the events interface of one of the client computing devices regarding participation in the in-game event,
      generates customized event instructions for execution by the requesting client computing device, wherein the event instructions are customized to the requesting client computing device based on interactions between the requesting client computing devices and the game server and based on the user received by the game server, and
      provides the requesting client computing device with customized in-game event access in accordance with the generated customized event instructions upon receiving the request without requiring further action from the requesting client computing device.

2. The system of claim 1, wherein the network computing device further:
   identifies one or more game titles of interest for each user; and
   filters the received in-game event information from the game server to generate a filtered list of the game titles of interest that are available for play.

3. The system of claim 2, wherein the network computing device identifies the game titles of interest based on a list of game titles of interest sent by the client computing device of the user.

4. The system of claim 1, wherein the network computing device further ranks the received in-game event information from the game server based on a number of different participants, and provides a ranked order of in-game events to the client computing devices.

5. The system of claim 1, wherein the network computing device further organizes the received in-game event information from the game server into a calendar, wherein the calendar indicates when in-game events are active.

6. The system of claim 5, wherein the calendar is searchable based on queries for specified games.

7. The system of claim 1, wherein the generated customized event instructions are executable by the client computing device to set up a peripheral for use in the in-game event.

8. The system of claim 7, wherein use in the in game event comprises communication with devices of users who are part of a same team competing in the in-game event.

9. The system of claim 1, wherein the network computing device further generates a notification regarding an event in the in-game event, wherein the notification is displayed while the user is engaged in non-tournament activities on the client computing device, and wherein the notification includes a link for customized access to the in-game event.

10. A method for providing an interactive events platform used for in-game events, the method comprising:
    hosting an in-game event via a game server;
    storing information about a user on a respective client computing device, wherein the respective client computing device has an events interface used to participate in the in-game event;
    receiving in-game event information from the game server, wherein the in-game event information includes instructions for customizing in-game event access based on the respective user information;
    forwarding the in-game event information to the client computing device, wherein the in-game event information appears on the events interface of the client computing device;
    receiving a request made through the events interface of the client computing device regarding participation in the in-game event; and
    executing instructions stored in memory by a processor to:
        generate customized event instructions, wherein the event instructions are customized to the requesting client computing device based on interactions between the requesting client computing devices and the game server and based on the user received by the game server, and
        provide the requesting client computing device with customized in-game event access in accordance with the generated customized event instructions upon receiving the request without requiring further action from the requesting client computing device.

11. The method of claim 10, further comprising:
    identifying one or more game titles of interest for the user; and
    filtering the received in-game event information from the game server to generate a filtered list of the game titles of interest that are available for play.

12. The method of claim 11, wherein the network computing device identifies the game titles of interest based on a list of game titles of interest sent by the client computing device of the user.

13. The method of claim 10 further comprising:
    ranking the received in game event information from the game server based on a number of different participants; and
    providing a ranked order of in-game events to the client computing devices.

14. The method of claim 10 further comprising organizing the received in-game event information from the game server into a calendar, wherein the calendar indicates when in-games events are active.

15. The method of claim 14, wherein the calendar is searchable based on queries for specified games.

16. The method of claim 10, wherein the generated customized event instructions are executable by the client computing device to set up a peripheral for use in the in-game event.

17. The method of claim 16, wherein use in the in-game event comprises communication with devices of users who are part of a same team competing in the in-game event.

18. The method of claim 10, further comprising generating a notification regarding an event in the in-game event, wherein the notification is displayed while the user is engaged in non-tournament activities on the client computing device, and wherein the notification includes a link for customized access to the in-game event.

\* \* \* \* \*